United States Patent [19]
Kleykamp et al.

[11] 3,802,991
[45] Apr. 9, 1974

[54] CONTINUOUSLY MANUFACTURED FLEXIBLE CONDUIT

[75] Inventors: Donald L. Kleykamp, West Carrolton, Ohio; Ivan Gaster; Vernon D. Browning, both of Waynesville, N.C.; Homer N. Holder, Sylva, N.C.

[73] Assignee: Dayco Corporation, Dayton, Ohio

[22] Filed: Feb. 13, 1973

[21] Appl. No.: 331,756

Related U.S. Application Data

[63] Continuation of Ser. No. 89,333, Dec. 13, 1970, Pat. No. 3,725,178.

[52] U.S. Cl. .............................................. 156/425
[51] Int. Cl. ................................................... B31c
[58] Field of Search .......... 29/527.4, 202.5; 156/86, 156/144, 244, 433, 425; 425/109, 113

[56] References Cited
UNITED STATES PATENTS
3,526,692  9/1970  Onaka ........................... 425/109 X

*Primary Examiner*—Charles W. Lanham
*Assistant Examiner*—Robert M. Rogers

[57] ABSTRACT

A wire is fed from a supply roll to a device which twists the wire on its longitudinal axis and continuously forms the twisted wire into a non-rotating helical coil. The coil is fed directly from the device through a plastic tube extruding head by a rotatable screw which extends within the coil, and a vacuum is created within the tube as it is extruded over the coil to shrink the tube between the turns of the coil. The coil reinforced tube may then be fed through a device which covers the tube with a continuous fabric member, and the covered tube is then fed through another extruder head which extrudes a second tube over the fabric member and shrinks the second tube onto the fabric member and the first tube. The coil feeding screw, the fabric member forming device, the extruders, and the tube feeding devices are driven at speeds correlated with the speeds of twisting and feeding the wire to provide a continuous conduit forming operation.

8 Claims, 7 Drawing Figures

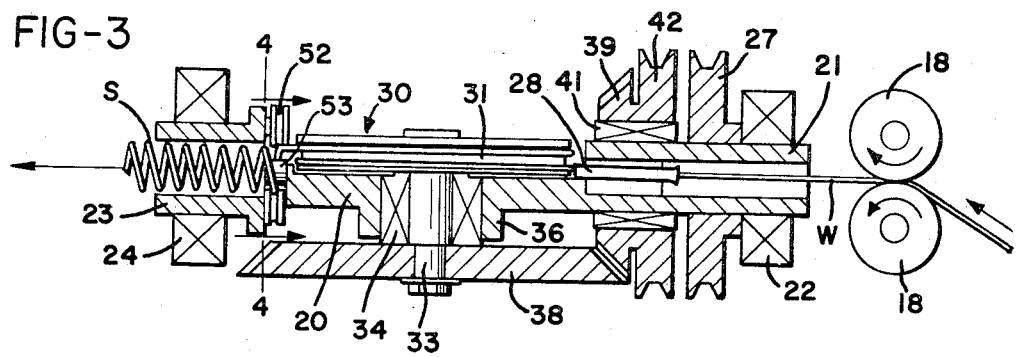
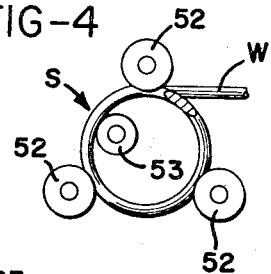
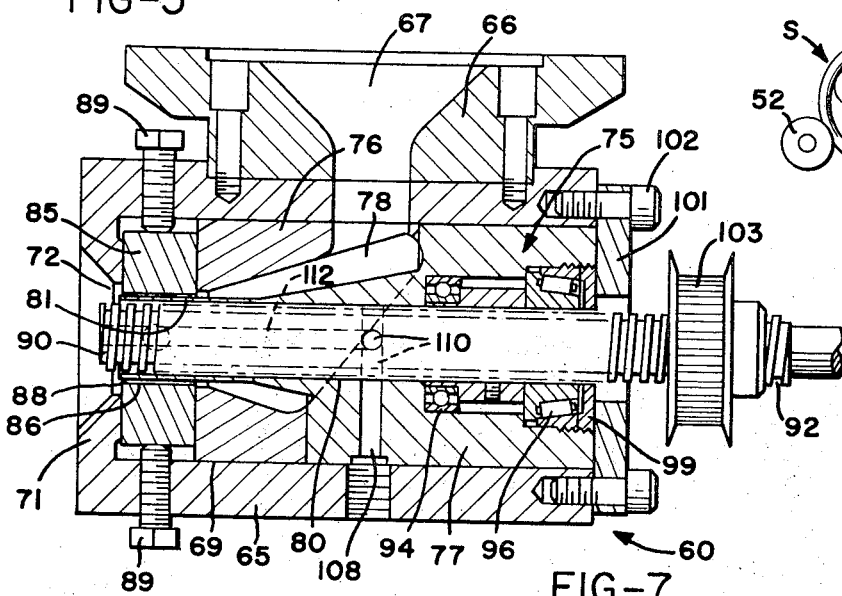
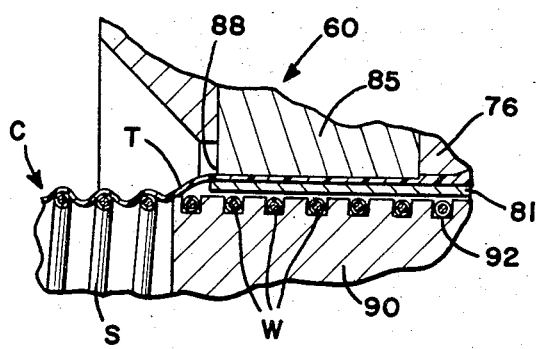
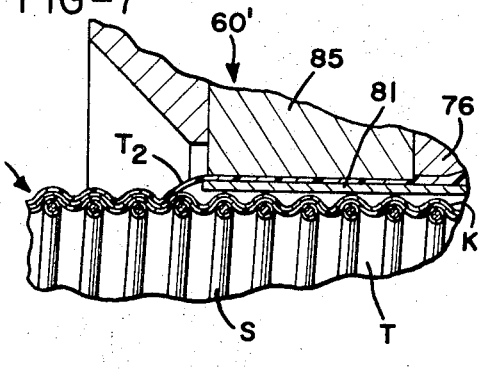

CONTINUOUSLY MANUFACTURED FLEXIBLE CONDUIT

This is a continuation of U.S. Pat. application Ser. No. 89,333, filed Nov. 13, 1970 now U.S. Pat. No. 3,725,178.

BACKGROUND OF THE INVENTION

The present invention relates to a continuously manufactured flexible conduit which is used for conveying fluids such as air, and the method and apparatus for manufacturing this conduit. More specifically, the conduit hereinafter described is the type having a helical reinforcing coil formed of axially spaced turns, about which is placed a plastic flexible tube. The purpose of this type of conduit is to provide passage of the fluid which it is conveying without substantial leakage, while at the same time being sufficiently strong to prevent collapse, light in weight for portability, and yet sufficiently flexible to permit bending.

Conventionally the helical coil is made of a plastic coated wire whis is formed with axially spaced turns and the tube is bonded to the turns of the wire to form a unitary product. Occasionally such a conduit is made with a fabric reinforcement such as a braided or knitted member, which is placed over the tube; optionally, a further plastic tube is placed over this fabric member. One such conduit is disclosed in U.S. Pat. No. 3,279,502, of common assignment, in which a series of coils is shown as being successivley fed through a plastic extruder which then covers the coils with a tube. The fabric member is placed over this tube which is then passed through another process which adds an outer member. In this patent the coils are stated as being capable of joining end to end in order to form a continuous conduit. This might be done, for example, by a welding operation as shown in U.S. Pat. No. 2,963,749. Such an operation, however, requires a complex mechanism and does not lend itself fully to a continuous process.

It has also been proposed to produce a reinforced conduit by wrapping a reinforcing wire on a rotating mandrel and feeding it through a plastic extruding head. U.S. Pat. No. 3,526,692 discloses such a device, but this requires that the plastic pipe be rotated as it extruded, and it would thus not be suitable for continuously producing flexible reinforced corrugated conduit which must be coiled into a roll after cooling.

SUMMARY OF THE INVENTION

The present invention is directed to an improved method and apparatus for continuously producing a flexible reinforced corrugated conduit which involves the feeding of a wire (which may have a plastic coating) from a supply roll, continuously forming the wire into a non-rotating helical coil, and continuously feeding the coil through a plastic extruder head which extrudes a plastic tube onto the coil and shrinks the tube onto the coil to form helical convolutions between the turns. The invention also provides for continuously feeding the reinforced tube received from the first extruder head through a machine which places a fabric member on the tube, such as by braiding, knitting, or weaving. The fabric covered tube assembly is fed through a second extruder head which extrudes and shrinks an outer plastic tube onto the fabric covered reinforced tube assembly to form a corrugated conduit having a double plastic wall with a fabric member between.

As used throughout this application, the term "plastic" as applied to the tube or the wire coating material, is intended to include such thermoplastic materials as vinyls, polyolefins, and the like; elastomeric materials such as natural or synthetic rubber; and other materials capable of flowing in a plastic state.

In accordance with a preferred embodiment of the invention, a plastic coated wire is fed from a supply roll to a wire coil forming device which twists the wire on its longitudinal axis and then rolls or forms the twisted wire into a helical coil. The speed of twisting of the wire is correlated with the speed of feeding the wire so that the device continuously generates or produces a non-rotating helical coil of predetermined diameter. The coil is fed from the forming device onto a feed screw which extends through a plastic extruder head and is driven at a speed correlated to the speed at which the helical coil is produced.

A plastic tube is extruded onto the helical coil at the discharge end of the extruder head, and a vacuum is produced within the coil to shrink the extruded tube radially inwardly between the wire turns of the coil and to form a positive bond between the plastic tube and the plastic coating on the wire. The conduit may be cut into predetermined lengths or coiled into a roll, or the conduit may be fed directly through a braiding or knitting machine to form a fabric covering member on the reinforced plastic tube.

The fabric covered tube is fed through a second plastic extruder head which covers the fabric member with an outer plastic tube and shrinks the tube onto the fabric member and the first tube by introducing a vacuum between the first tube and the second tube as the latter is being extruded. The wire twisting and feeding means, the spring feeding screw, each of the extruders, the fabric covering machine and the two tube feeding conveyors are all driven at correlated speeds according to the desired production rate of the reinforced flexible conduit.

Additional features and advantages of the invention will be apparent from the following description, the accompanying drawings, and the appeneded claims.

BRIEF DESCRIPTION OF THE DRAWINGS

FIG. 3 is a fragmentary section taken generally on line 3—3 of FIG. 1.

FIG. 4 is a fragmentary section taken generally on the line 4—4 of FIG. 3.

FIG. 5 is an axial section of an extruder head included in the apparatus shown in FIG. 1.

FIG. 6 is an enlarged fragmentary section of the discharge end of the extruder head in FIG. 5 and showing the forming of a single plastic wall conduit.

FIG. 7 is a fragmentary section similar to FIG. 6 of the extruder head included in the apparatus in FIG. 2 and showing the forming of a double plastic wall conduit.

DESCRIPTION OF THE PREFERRED EMBODIMENT

Figure 1:
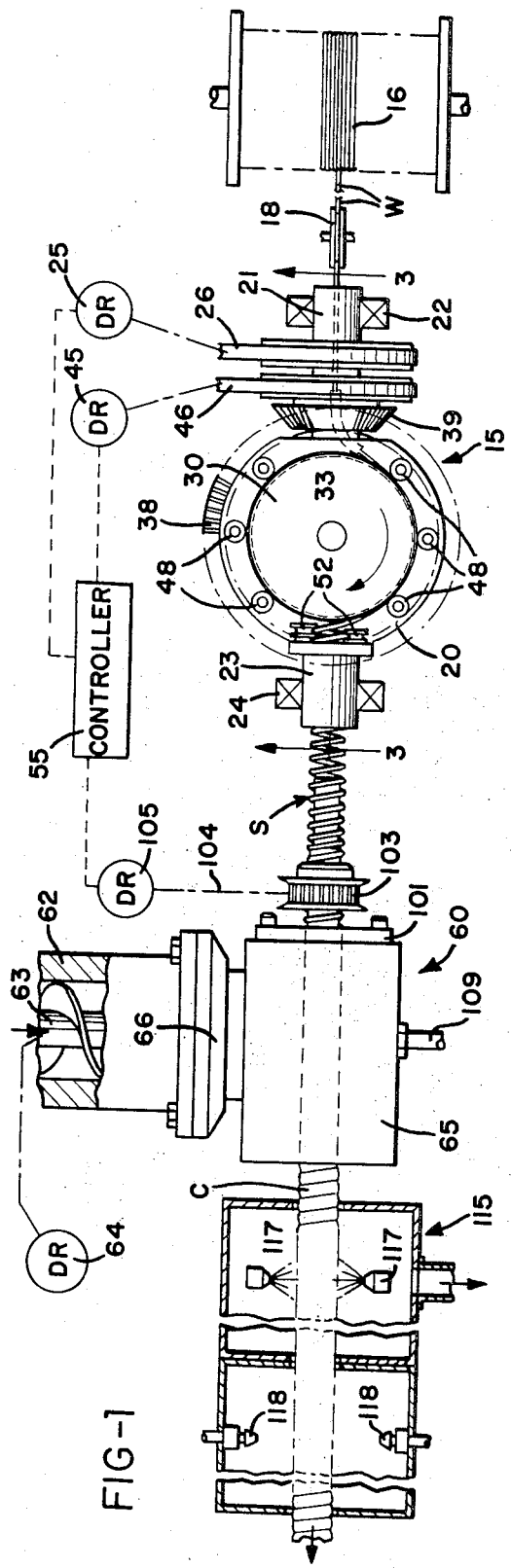
FIG. 1 is a general diagrammatic plan view of apparatus for continuously producing a reinforced flexible conduit in accordance with the invention.

Referring to the apparatus shown in FIG. 1, a coil forming machine or device 15 is adapted to receive a plastic coated wire W from a supply roll 16. A pair of rollers (FIGS. 1 and 3) form a nip which receives the wire W before the wire enters the spring forming device 15 and serve to prevent twisting of the wire between the supply roll 16 and the roller 18. The forming device 15 includes a rotatable base member 20 having a tubular inlet portion 21 supported by an anti-friction bearing 22, and an aligned tubular outlet portion 23 supported by an anti-friction bearing 24. The base member 20 thus rotates on the axis of the tubular portion 21 and 23 and is driven by a variable speed motor 25 through a belt 26 directed around a pulley 27 secured to the tubular inlet portion 21 of the base number.

The plastic coated wire W is directed from the anti-twist rollers 18 through a curved guide tube 28 located within the tubular inlet portion 21 of the base member 20, and is then directed around a feed wheel 30 having a peripheral recess 31 which receives the wire. The wheel 30 is mounted on one end portion of a shaft 33 which is rotatably supported by an anti-friction bearing 34 retained within a hub portion 36 of the base member 20. A beveled gear 38 is secured to the opposite end portion of the shaft 33 and meshes with another bevel gear 39 rotatably supported by an anti-friction bearing 41 mounted on the inlet portion 21 of the base member 20. A pulley 42 is rigidly connected to the gear 39 and is driven by a variable speed motor 45 through a V-belt 46.

A plurality of rollers 48 are arranged around the periphery of the feed wheel 30 and are rotatably supported on the base member 20. The rollers 48 have resilient outer surfaces and serves to retain the wire W within the recess 39 on the outer surface of the feed wheel 30. Thus when the wheel 30 is rotated by the motor 45, the wire W is pulled or fed from the supply roll 16, between he rollers 18, and through the curved guide tube 28.

The wire W is wrapped one turn around the feed wheel 30 and is directed from the wheel 30 between a set of external wire forming rollers 52 (FIG. 4) and an internal forming roller 53 which are rotatably supported by the base member 20. The rollers 52 and 53 have circumferential grooves and are adjusted both radially and axially to form the wire W into axially spaced turns which make up the coil S. The forming rollers 52 and 53 are set so that after the wire W is coiled and springs back slightly, the outer diameter of the coil S is slightly less than the inner diameter of the tubular outlet portion 23 of the base member 20.

As shown in FIG. 1, the variable speed motors 25 and 45 are operated from a main controller 55. As the wire W is being fed through the forming device 15 by rotation of the wheel 30, the base member 20 is rotated by the motor 25 to cause twisting of the wire W on its longitudinal axis between the feed wheel 30 and the rollers 18. The motors 25 and 45 are adjusted or correlated so that during each revolution of the base member 20, sufficient wire W is fed by the wheel 30 to form one convolution or turn of the helical coil S. As a result, the coil is continuously formed and feeds through the outlet portion 23 without any rotation of the coil on its longitudinal axis.

While the forming device 15 described above illustrates one means for continuously producing a helical coil without producing rotation of the coil, it is to be understood that other machines for forming a non-rotating helical coil may be employed without departing from the scope of the invention. Preferably, however, the non-rotating helical coil is produced by twisting of a wire on its axis at a speed correlated with the longitudinal or axial feed of the wire.

Referring to FIG. 1 and 5, the helical coil S is fed from the forming device 15 directly into an extruder head 60 which receives a flowable plastic material such as a synthetic or natural rubber or a thermoplastic material, from an extruder barrel 62 enclosing a screw 63 driven by a variable speed motor 64. The extruder head 60 includes a hollow cylindrical housing 65 (FIG. 5) which is secured to the barrel 62 by a coupling flange 66 defining an inlet 67 which extends through the housing 65. The housing 65 has a cylindrical bore 69 which extends from an inwardly projecting flange 71 defining a tapered circular outlet 72.

A cartridge-type insert body or unit 75 is received within the bore 69 and includes a forward portion 76 which cooperates with a rearward portion 77 to define an annular tapered distributing chamber 78 extending from the inlet 67. The rearward portion 77 of the unit 75 defines an elongated cylindrical bore 80 which extends through a tubular sleeve portion 81 projecting axially through the distributing chamber 78. An annular extrusion die 85 is positioned between the housing flange 71 and the forward portion 76 of the unit 75 and has a cylindrical bore or opening 86 which receives and cooperates with the sleeve portion 81 to define an annular cylindrical discharge orifice 88. The die 85 is positioned radially relative to the sleeve portion 81 by a set of four uniformly spaced screws 89.

An elongated feed screw 90 extends through the bore 80 within the unit 75 and has a single external helical groove 92 with a depth approximately the same as the diameter of the wire W. The pitch of the groove 92 corresponds with the spacing between the convolutions or turns of the coil S, and the screw 90 receives the coil directly from the forming device 15. The screw 90 is rotatably supported within the unit 75 by an anti-friction ball bearing 94 (FIG. 5) and an axially spaced tapered roller bearing 96. The bearings are retained within corresponding counterbores 97 and 98 by a threaded annular fitting 99. The inner races of the bearings 94 and 96 are press fitted on the screw 90, and the outer race of the tapered roller bearing 96 is pressed axially by the fitting 99 so that the screw 90 will rotate within the bore 80 without any lateral play or wobble.

The assembly of the body 75 and the screw 90 are retained within the housing by an annular plate 101 and a series of screws 102. A sheave or pullye 103 is press fitted on the leading projecting end portion of the screw 90 and is driven by a belt 104 (FIG. 1) extending from a variable speed motor 105. The motor 105 is also operated from the controller 55 and is controlled so that the screw 90 is rotated or driven at a speed correlated with the speed of the motors 25 and 45.

A radially extending passage 108 is formed within the housing 64 and insert unit 75 of the extruder head 60 and is connected by a line 109 to a suitable vacuum source (not shown). The passage 108 extends inwardly to the bore 80 adjacent a series of four radially extending ports 110 (FIG. 5) formed within the screw 90. A passage 112 extends axially through the screw 90 from the ports 110 to the discharge end of a screw 90 and cooperates with the ports 110 to create a vacuum adjacent the discharge end of the screw 90.

As the helical coil S is fed through the extruder head 60 by the rotating screw 90, a plastic tube T is extruded from the orifice 88 in overlying surrounding relation to the coil S. The hot plastic tube T is reduced or shrunk inwardly by the vacuum created through the passage 112 and through the clearance space between the outer surface of the screw 90 and the inner surface of the tubular sleeve portion 81 of the insert body 75. The vacuum shrinking of the tube T produces a positive bond between the tube and the plastic coated wire W and also produces helical convolutions in the tube T between the turns of the wire W as shown in FIG. 6. The motor 64 for driving the feed screw 63 of the plastic extruder, is controlled according to the axial feed rate of the helical coil S so that the plastic tube T is extruded at a rate sufficient to provide for the convolutions within the tube between the turns of the coil S.

The extruded plastic tube T and the reinforcing helical coil S form a non-rotating tubular conduit C which is directed through a cooling device 115 (FIG. 1) where the conduit passes through either a water filled trough or water sprays directed from a series of nozzles 117. After the extruded tube T is cooled, the conduit C may be dried by a blast of hot air from a plurality of nozzles 118 and then wound onto a roll, or cut into sections of predetermined length.

MODIFICATION

Figure 2:
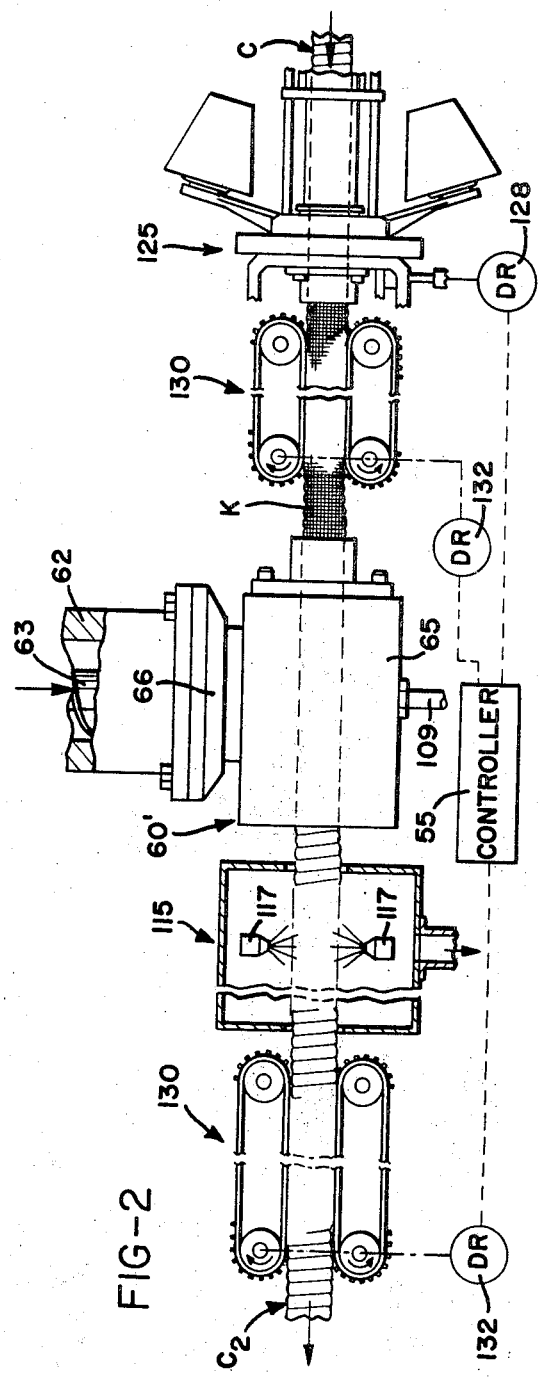
FIG. 2 is a diagrammatic plan view of apparatus for receiving the conduit produced by the apparatus shown in FIG. 1 and continuously producing a double plastic wall flexible corrugated conduit.

A further embodiment of the invention is illustrated in FIGS. 2 and 7, in which conduit C, after cooling and drying as above, may be fed directly into a braiding or knitting machine 125 which forms a tubular fabric member K tightly overlying or surrounding the plastic tube T. The member K may be formed by a knitting head, for example, as disclosed in U.S. Pat. No. 2,259,384, or may be formed by a braiding machine, for example, as disclosed in U.S. Pat. No. 3,038,523. The braiding or knitting machine 125 is driven by a variable speed motor 128 which is also operated from the main controller 55. The resulting assembly is fed through the machine 125 by a pair of opposing caterpillar-type conveyors 130 which are also driven by a variable speed motor 132 operated from the controller 55. The spacing between the conveyors 130 is precisely adjusted so that the conduit is positively gripped without significantly compressing the conduit.

The conveyors 130 also feed the conduit assembly from the machine 125 directly into another extruder head 60' which is constructed substantially identical to the extruder head 60 except that the feed screw 90 and its corresponding drive is omitted. Accordingly, the components of the extruder head 60' carry the same reference numbers as the corresponding components of the extruder head 60. As shown in FIG. 7, the extruder 60' produces an outer plastic tube $T_2$ which overlies or surrounds the conduit assembly and is in direct contact with fabric member K. The plastic tube $T_2$ is shrunk onto the assembly by the partial vacuum which is created at the discharge end of the extruder within the outer tube $T_2$ through the clearance space between the inner cylindrical surface of the tubular sleeve portion 81 of the insert member 75 and the outer surface of the fabric member K.

The shrinking of the plastic tube $T_2$ onto the conduit assembly produces a conduit $C_2$ having an inner reinforcing helical coil S surrounded by a double wall structure consisting of the inner plastic tube T and the outer plastic tube $T_2$ with the fabric member K sandwiched between the plastic tubes in a manner as shown in the above-mentioned U.S. Pat. No. 3,279,502. As further shown in FIG. 2, the double plastic wall conduit $C_2$ is fed from the extruder head 60' through another water cooling device 115 by another set of caterpillar-type conveyors 130 driven by a corresponding variable speed motor 132 operated from controller 55. In a manner as mentioned above in connection with the single plastic tubular wall conduit C, the non-rotating double plastic wall conduit $C_2$ may be coiled into a roll or cut into lengths.

From the drawings and the above description, it is apparent that the apparatus and method of the invention provide several desirable features and advantages. For example, the device 15 is effective to twist and feed the plastic coated wire W at relative correlated speeds for continuously producing a non-rotating helical coil S. Furthermore, the speed of the motor 105 is controlled in accordance with the speeds of the motors 25 and 45 to feed the continuously produced non-rotating coil directly through the extruder head 60 for continuously producing the flexible reinforced tubular conduit C.

Another important feature is provided by introducing a vacuum within the extruder head 60 and the feed screw 90 through the line 109 to cause shrinking of the plastic tube T onto the coil S and between the wire convolutions immediately after the tube is extruded from the head 60 and while the tube is still hot and pliable. The screws 89 also provide the advantage of adjusting the die 85 radially to provide precise concentricity between the die bore 86 and the tubular sleeve portion 81 of the insert member 75. This not only provides for obtaining plastic tubes of precisely uniform wall thickness, but also provides for interchanging dies 85 when it is desired to change the wall thickness of the tube T.

As disclosed in connection with FIGS. 2 and 7, the present invention further provides for continuously producing a reinforced conduit $C_2$ having a multiple layer wall consisting of the inner plastic tube T, a tightly wound fabric member K and the outer plastic tube $T_2$. By introducing a vacuum into the second extruder head 60 through the line 109, the outer plastic tube $T_2$ is reduced in diameter or shrunk onto the fabric member K and inner plastic tube T to form the helical convolutions within the outer plastic tube $T_2$ between the turns of the coil S and to form a permanent bond between the plastic tubes and the fabric member.

It is also within the scope of the invention to modify the forming device 15 and the feed screw 90 of the extruder head 60 for continuously producing a flexible reinforced conduit wherein the reinforcing coil is constructed of two or more insulated electrical wires. Such a conduit is commonly used with a canister type vacuum sweeper for transmitting electrical power from the main unit to a portable suction head incorporating a motor driven beater. That is, the forming device 15 may be easily modified to receive two or three coated or insulated wires W to form the wires into a double or triple helical coil. A modified feed screw 90 having corresponding double or triple helical grooves would then be used for feeding the multiple turns through the extruder head 60. It should also be understood that a flexible reinforced conduit constructed in accordance with the invention, may be provided with longitudinally extending reinforcing wires or cords such as disclosed in U.S. Pat. No. 3,058,493. These wires would be fed directly into the extruder head 60 or 60' and be located between the coil S and the plastic tube T or between the tube T and the fabric member K.

While the method therein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

We claim:

1. Improved apparatus for producing a continuous flexible reinforced tubular conduit having a uniform structure along the length thereof, said apparatus comprising means for supporting a relatively large supply roll of wire for rotation on a stationary axis, a rotary coil-forming unit separate from said roll-supporting means and including means for deforming the wire beyond its elastic limit into a helical coil, means for supporting said coil-forming unit for rotation, means for directing the wire from said roll-supporting means to said wire deforming means, means for driving said rotary coil-forming unit to produce a continuous nonrotating helical coil having continuous convolutions of uniform diameter, an extruder head having means for receiving a plastic material in a flowable condition, means for feeding said coil axially in a nonrotating manner from said coil-forming unit through said extruder head, means for correlating the speed of said coil-feeding means with the speed of said means for driving said coil-forming unit to effect a smooth continuous uniform flow of the helical coil from said coil-forming unit through said extruder head, means within said extruder head for forming a tube of a plastic material around said coil, and means for shrinking said plastic tube onto said coil.

2. Apparatus as defined in claim 1 wherein the axis of the wire roll-supporting means is disposed at substantially a right angle with the axis of rotation of said rotary coil-forming unit.

3. Apparatus as defined in claim 1 wherein said supporting means for said rotary coil-forming unit includes means defining a generally cylindrical bore for receiving the helical coil as it is being formed.

4. Apparatus as defined in claim 1 wherein said extruder head includes means defining a generally cylindrical bore for receiving the helical coil, and the axis of said bore is substantially aligned with the axis of rotation of said coil-forming unit.

5. Apparatus as defined in claim 1 wherein said means for directing the wire includes a wheel on said rotary coil-forming unit, and said wheel has an axis of rotation disposed at a substantially right angle relative to the axis of rotation of said coil-forming unit.

6. Apparatus as defined in claim 1 wherein said rotary coil-forming unit includes means for gripping the wire and pulling it from the wire supply roll supported by said roll-supporting means.

7. Apparatus as defined in claim 1 wherein said means for supporting the wire roll and said extruder head are disposed generally axially on opposite ends of said rotary coil-forming unit.

8. Improved apparatus for producing a continuous flexible reinforced tubular conduit having a uniform structure along the length thereof, said apparatus comprising means for supporting a relatively large supply roll of wire for rotation on a stationary axis, a rotary coil-forming unit separate from said roll-supporting means and including means for deforming the wire beyond its elastic limit into a helical coil, means for supporting said coil-forming unit for rotation, means for directing the wire from said roll-supporting means to said wire deforming means, means for driving said rotary coil-forming unit to produce a continuous nonrotating helical coil having continuous convolutions of uniform diameter, said supporting means for said rotary coil-forming unit including means defining a generally cylindrical bore for receiving the helical coil as it is being formed, an extruder head having means for receiving a plastic material in a flowable condition, means for feeding said coil axially in a nonrotating manner from said coil-forming unit through said extruder head, means for correlating the speed of said coil-feeding means with the speed of said means for driving said coil-forming unit to effect a smooth continuous uniform flow of the helical coil from said coil-forming unit through said extruder head, means within said extruder head for forming a tube of a plastic material around said coil, means for shrinking said plastic tube onto said coil, said means for supporting the wire roll and said extruder head being disposed generally axially on opposite ends of said rotary coil-forming unit.

* * * * *

UNITED STATES PATENT OFFICE
CERTIFICATE OF CORRECTION

Patent No. 3,802,991      Dated April 9, 1974

Inventor(s) DONALD L. KLEYKAMP, ET. AL.

It is certified that error appears in the above-identified patent and that said Letters Patent are hereby corrected as shown below:

On the cover sheet insert -- The portion of the term of this patent subsequent to April 3, 1990, has been disclaimed. -- .

Signed and sealed this 21st day of January 1975.

(SEAL)
Attest:

McCOY M. GIBSON JR.
Attesting Officer

C. MARSHALL DANN
Commissioner of Patents